Aug. 28, 1934.   M. R. BAUER   1,971,846
COMBINATION FRICTION AND POSITIVE CLUTCH
Filed June 22, 1933   4 Sheets-Sheet 1

Inventor

M. R. Bauer

By Clarence A. O'Brien
Attorney

Aug. 28, 1934.  M. R. BAUER  1,971,846
COMBINATION FRICTION AND POSITIVE CLUTCH
Filed June 22, 1933  4 Sheets-Sheet 2
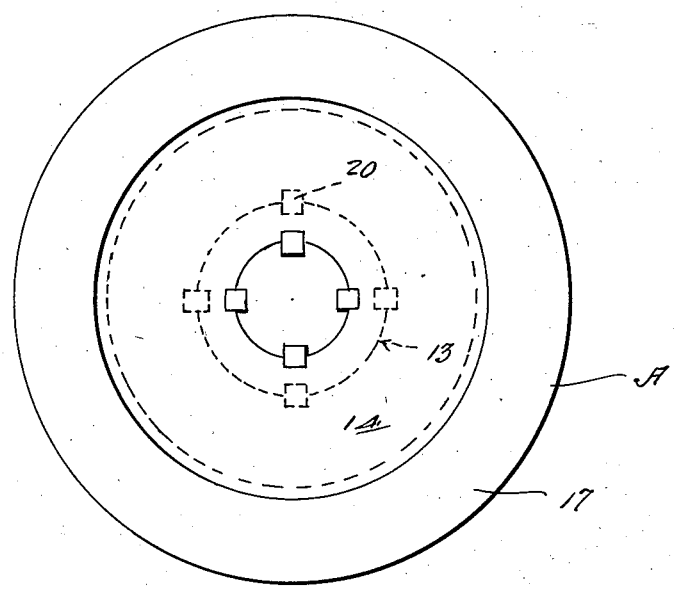
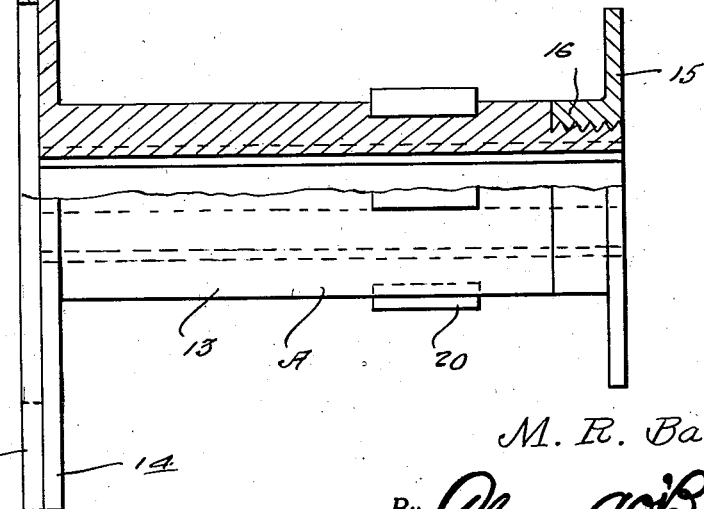
Inventor
M. R. Bauer
By Clarence A. O'Brien
Attorney Aug. 28, 1934.  M. R. BAUER  1,971,846
COMBINATION FRICTION AND POSITIVE CLUTCH
Filed June 22, 1933   4 Sheets-Sheet 3
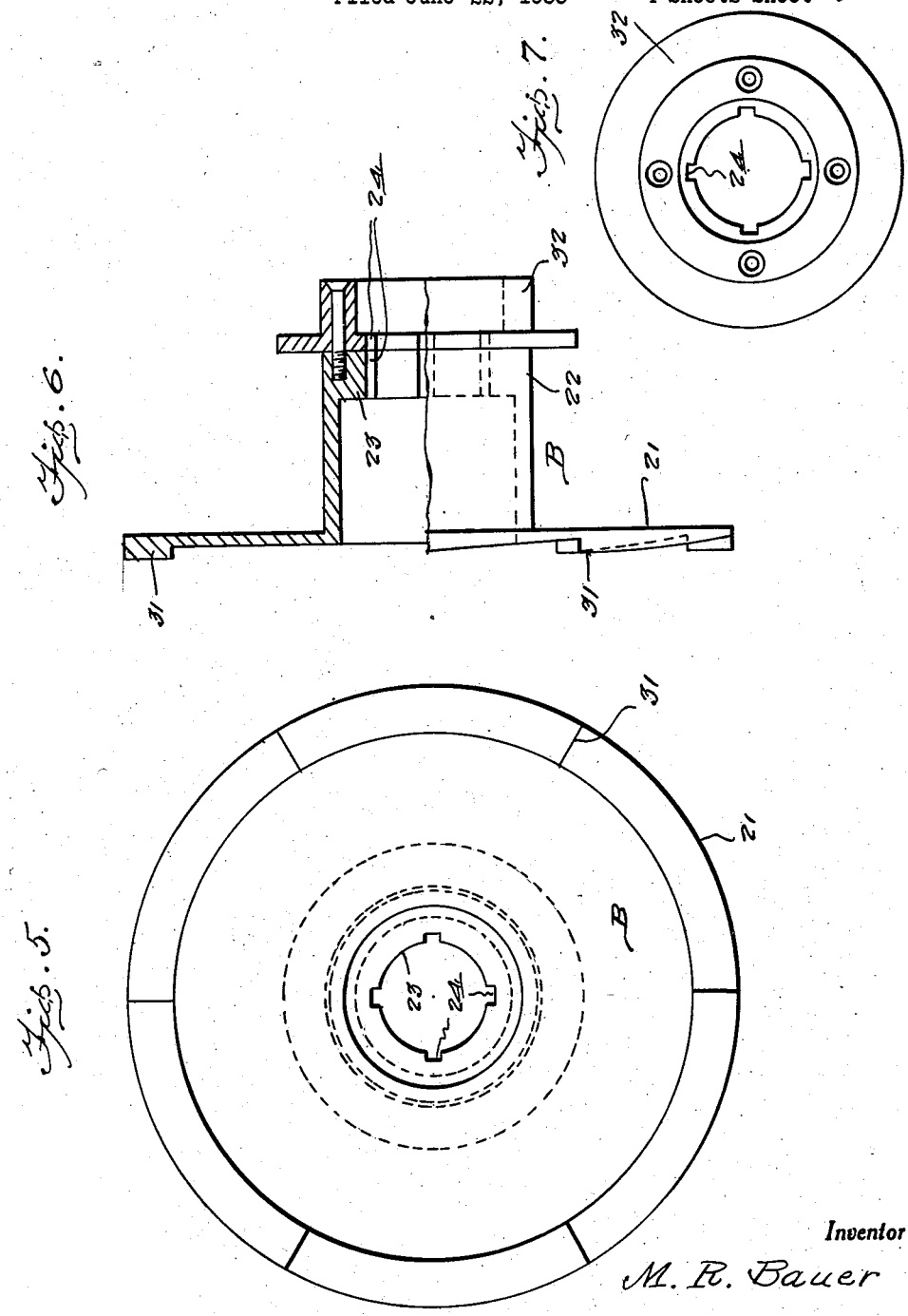
Inventor
M. R. Bauer
By Clarence A. O'Brien
Attorney Aug. 28, 1934.　　　M. R. BAUER　　　1,971,846
COMBINATION FRICTION AND POSITIVE CLUTCH
Filed June 22, 1933　　4 Sheets-Sheet 4
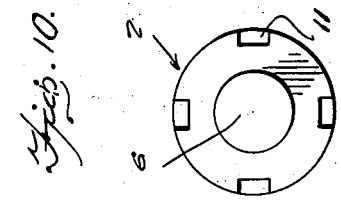
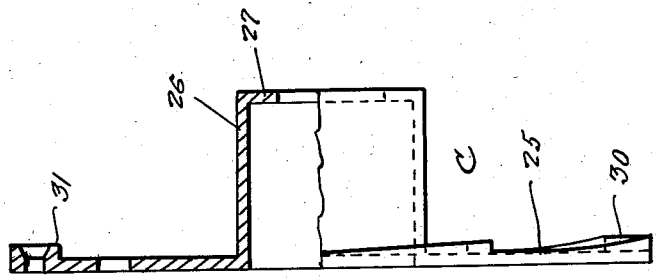
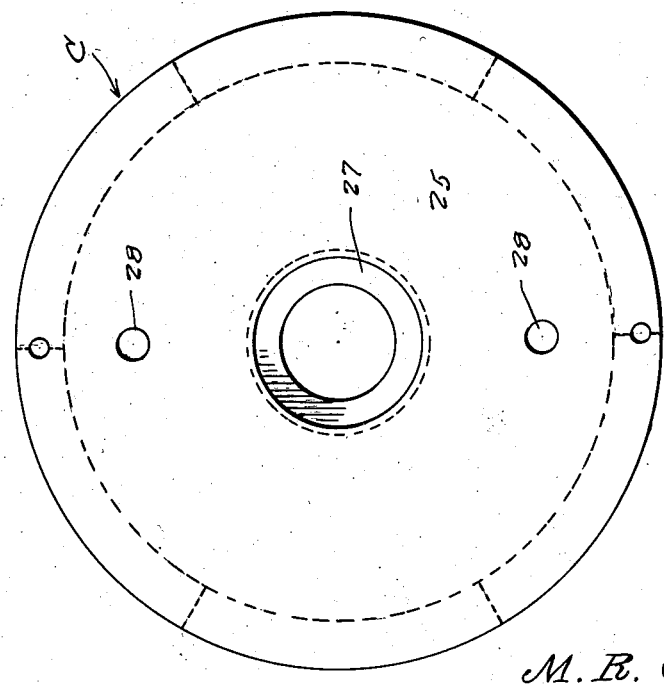
Inventor
M. R. Bauer
By Clarence A. O'Brien
Attorney Patented Aug. 28, 1934

1,971,846

UNITED STATES PATENT OFFICE 1,971,846

COMBINATION FRICTION AND POSITIVE CLUTCH

Mathias Robert Bauer, Tarrytown, N. Y.

Application June 22, 1933, Serial No. 677,139

1 Claim. (Cl. 192—53)

This invention relates to a combination friction and positive clutch, the general object of the invention being to provide a friction clutch and a positive clutch, with means whereby the positive clutch will engage after the friction clutch is fully engaged and said positive clutch will disengage before the friction clutch disengages, the positive clutch acting to prevent slippage of the friction clutch and also aids in the prevention of glazed surfaces on the friction plate linings of the friction clutch.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 3 is a view of the inner end of the pressure member.

Figure 4 is an elevation, partly in section, of said member.

Figure 5 is a view of the inner end of the outer claw member of the positive clutch.

Figure 6 is a side view, partly in section, of said member.

Figure 7 is an end view of the cap or friction draw-out plate, which is bolted to the outer claw member.

Figure 8 is a view of the inner end of the inner claw member.

Figure 9 is a side view, partly in section, of said member.

Figure 10 is a view of the inner end of the driven shaft.

Figure 2:
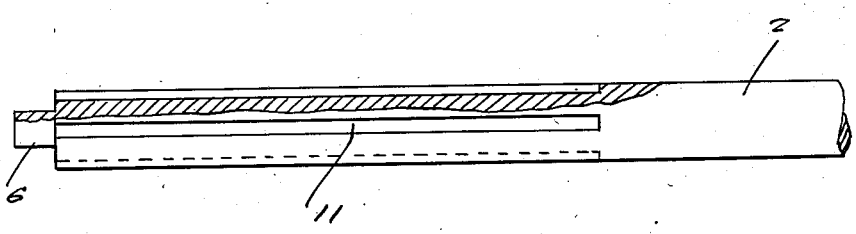
Figure 2 is a view partly in section of the driven shaft.

In these drawings, the numeral 1 indicates the drive shaft and the numeral 2 the driven shaft and the numeral 3 indicates the fly wheel or housing which is fastened in any suitable manner to the shaft 1, such as by means of the bolts 4 engaging the flange of a member 5 welded or otherwise fastened to the shaft 1. One end of the shaft 2 is reduced, as shown at 6, and is rotatably supported at the central part of the housing 3 by the anti-friction means 7. Bolts 8 are carried by the housing 3 and slidably support the friction disks 9 which alternate with the friction disks 10 which are slidably arranged on the shaft 2, but rotate with said shaft. As shown more clearly in Figure 2, the inner part of the shaft 2 is formed with the longitudinally extending keyways 11 to receive keys formed on the disks 10 and said disks are provided with the usual linings 12.

Figure 1:
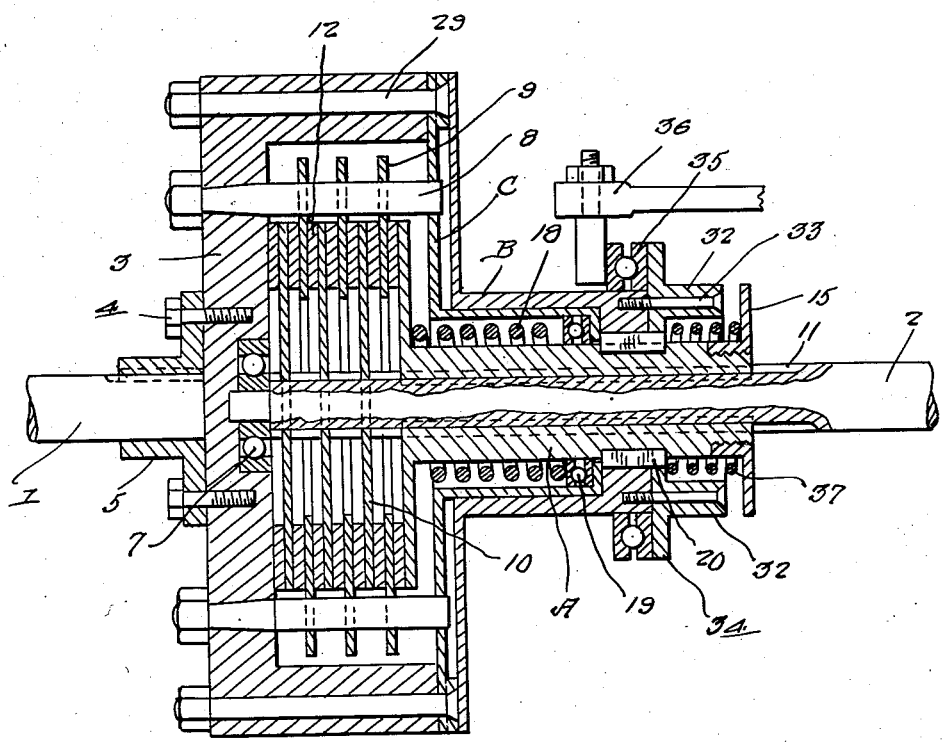
Figure 1 is a longitudinal sectional view through the invention.

The friction member, shown generally at A, has a tubular part 13 provided with a disk-like flange 14 at its inner end and a smaller disk 15 has a hub part 16 threaded to the outer reduced end of the tubular part 13, as shown more clearly in Figure 4. The flange 14 carries a lining 17 which engages the outermost disk 9, as shown in Figure 1. The tubular part 13 of the member A has keys therein for engaging the keyways 11 of the shaft 2, so that the member A is slidably arranged on the shaft 2, but rotates therewith. A spring 18 encircles a part of the tubular portion 13 and has one end bearing against the flange 14 and its other end against a thrust anti-friction bearing 19 and tends to force the friction disks together so that the shaft 2 will be driven from the shaft 1.

The part 13 of the member A carries an annular row of short keys 20 and an outer claw member B, composed of a flange 21 and a tubular part 22 has an internal collar 23 in its tubular part 22 which is formed with the keyways 24 for receiving the keys 20. An inner claw member C, composed of a flange 25 and a tubular part 26, has its tubular part 26 fitting in the tubular part 22 of the outer claw member B, with the flange 27 on the outer end of the tubular part 26 forming a seat for the thrust bearing 19, this flange also bearing against the internal collar 23 of the member B. The flange 25 of this member C has holes 28 therein for receiving the free ends of the bolts 8 and said flange is fastened to the housing 3 by the bolts 29. The outer face of this member C has cam surfaces 30 thereon, while the member B has the cam surfaces 31 thereon, these surfaces being made somewhat in the form of ratchet teeth of considerable length so that when the cams 31 of the member B engage the cams 30 of the member C, the parts will be locked together in a positive manner so that the shaft 1 will drive the shaft 2.

The positive clutch throw-out plate 32 is fastened to the outer end of the tubular part 22 of the member B by the bolts 33 and this member 32 is formed with a flange 34 against which the anti-friction bearing 35 abuts, this member 35 being engaged by the yoke 36 for adjusting the parts of the clutch. A spring 37, of less strength than the spring 18, encircles the outer portion of the member A and bears against the flange 15, with its inner end bearing against an internal flange formed on the member 32 and which forms part of the internal collar 23.

From the foregoing, it will be seen that with the yoke 36 in inoperative position, the spring 18 bearing against the flange 14 of the member A, will press the two sets of disks 9 and 10 together so that the friction clutch formed by these parts will connect the shaft 1 with the shaft 2, so that the shaft 2 will be driven by the shaft 1. The parts are held against slippage by the cams 30 on the member C, which is fastened to the housing 3, engaging the cams 31 on the member B. When the clutch is to be released, the yoke is moved into engagement with the anti-friction bearing 35 to move the member 32 and the member B, to which the member 32 is connected, outwardly against the action of the spring 37 and this movement will disengage the cams 31 from the cams 30 and this movement of the member B will compress the spring 37 and when this spring has been sufficiently compressed, it will act on the flange 15 and thus move the member A against the action of the spring 18 and thus the disks will be separated so that the friction clutch is rendered inoperative and the shaft 2 will not be driven by the shaft 1.

When the yoke is moved to inoperative position, the spring 18 will first engage the disks of the friction clutch and then the spring 37 will move the member B into engagement with the member C and then, if the friction clutch should start to slip, the cam parts 30 and 31 will engage each other and this will positively lock the shaft 2 to the housing 3 and, therefore, to the shaft 1.

From the foregoing it will be seen that the positive clutch mechanism will be able to engage after the friction clutch is fully engaged and that when the friction clutch slips, after being fully engaged, the positive clutch will then automatically engage. The positive clutch is fully disengaged before the friction clutch starts to disengage.

This invention insures a positive connection between the driving and driven shafts, prevents slippage at high speed or due to overload and aids in the prevention of glazed surfaces on the friction disk linings.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

In combination with a drive shaft and a driven shaft, a housing connected to the drive shaft, clutch disks slidably arranged in the housing, friction disks alternating with the clutch disks and slidably but non-rotatably connected with the driven shaft, a pressure member including a disk and a tubular stem, the disk of said member engaging one of the clutch disks and the tubular stem being slidably but non-rotatably connected with the driven shaft, an inner positive clutch member including a disk and a tubular stem, means for connecting the disk to the housing and the tubular stem surrounding and being spaced from a part of the tubular stem of the pressure member, the outer end of the tubular stem of the clutch member forming an internal flange, a spring surrounding said portion of the stem of the pressure member and having one end bearing against the disk of said pressure member, a thrust bearing against which the other end of the spring bears, said thrust bearing engaging the flange, a second positive clutch member including a disk and a tubular stem, said tubular stem surrounding the tubular stem of the inner clutch member and a part of the tubular stem of the pressure member, means for slidably but non-rotatably connecting the stem of the second clutch member with the stem of the pressure member, a projection on the outer end of the stem of the pressure member, an internal projection on the stem of the second clutch member, a spring of less strength than the first mentioned spring located between the projections, cooperating cam surfaces on the disks of the clutch members, and manually operated means for moving the second clutch member outwardly to free its cam surfaces from the cam surfaces of the first clutch member and to compress the lighter spring to move the pressure member to inoperative position when said lighter spring has been compressed to a sufficient degree to overcome the resistance of the first spring to outward movement of the pressure member.

MATHIAS ROBERT BAUER.